United States Patent Office 3,400,301
Patented Sept. 3, 1968

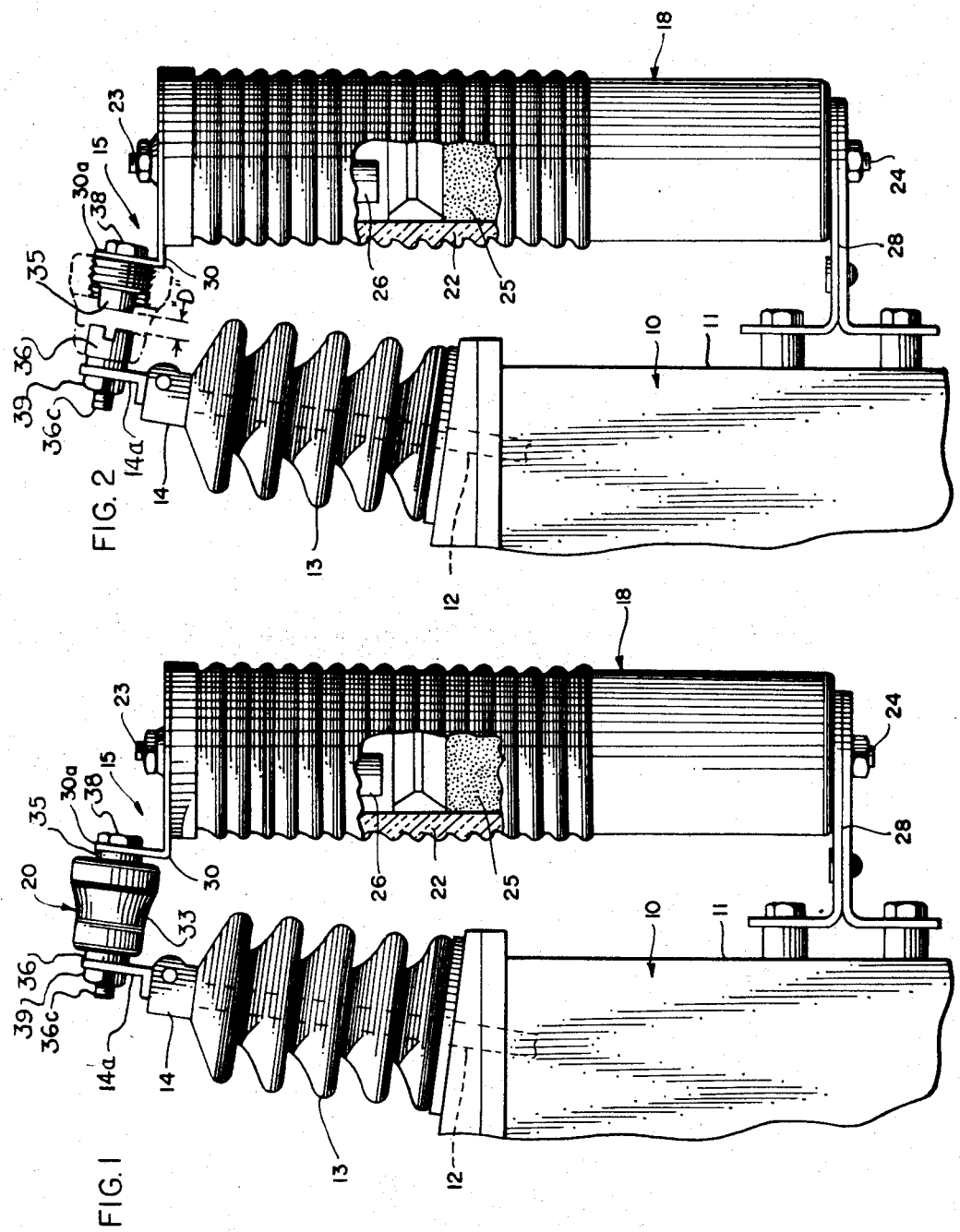

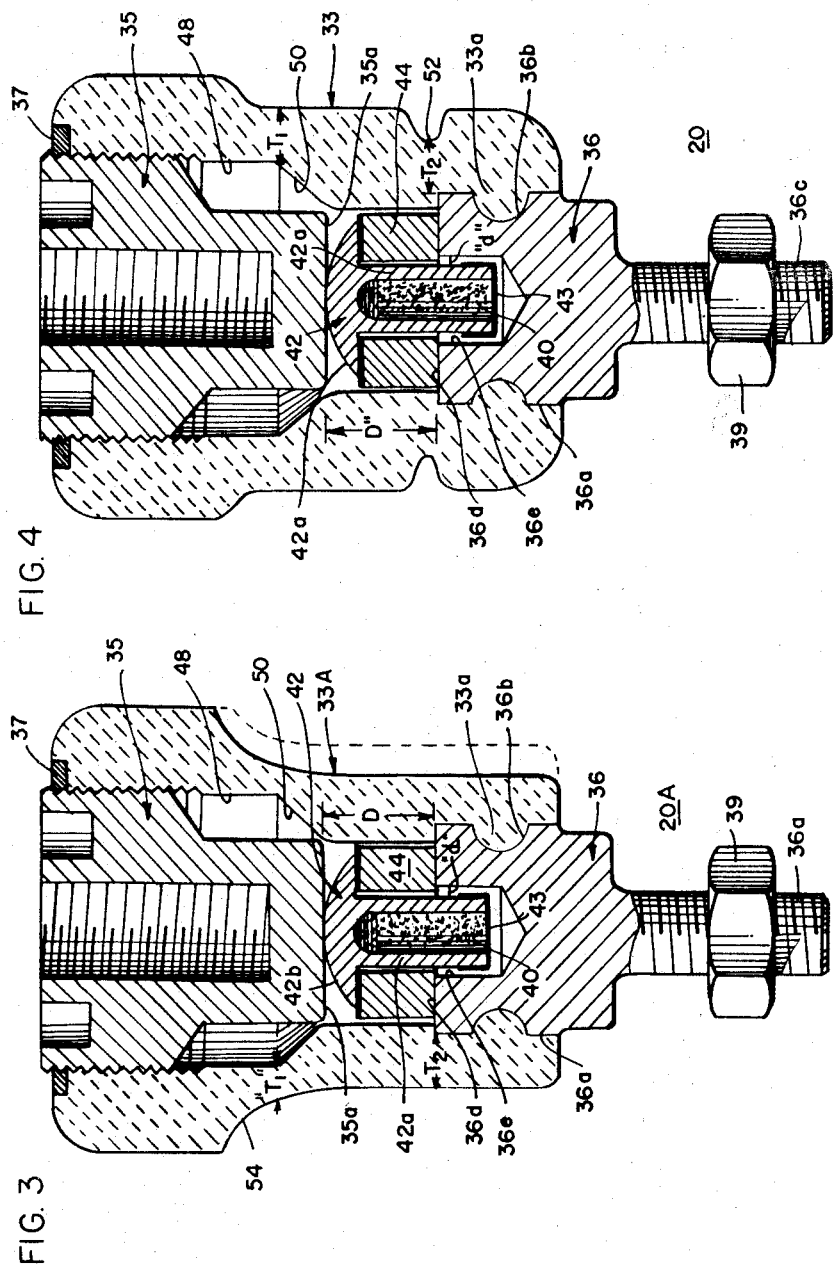

3,400,301
LIGHTNING ARRESTER IN COMBINATION WITH
AN ARRESTER DISCONNECTOR CONTAINING
EXPLOSIVE MEANS
Donald O. Misare, Riverside, Ill., assignor to Joslyn Mfg.
and Supply Co., Chicago, Ill., a corporation of Illinois
Filed May 27, 1966, Ser. No. 553,509
15 Claims. (Cl. 317—71)

The present invention relates to a new and improved lightning arrester disconnector system and, more particularly, the present invention is concerned with improvements in lightning arrester disconnector systems for the protection of electric transmission components, such as power distributing transformers, and to power distribution transformer assemblies having improved lightning protective means.

Lightning arrester disconnector systems are employed in electrical transmission systems to provide protection against abnormal voltages existing on power distribution components resulting from surges caused by lightning, switching disturbances, and other factors. The function of the lightning arrester disconnector system is to provide a low resistance pass to ground upon the occurrence of excess voltages on the components caused by disturbances of the type described and, at the same time, to present a relatively high resistance under normal operating conditions so that the diversion of power current from the component is insignificant.

Present commercial practice in the protection of power transmission components generally includes the use of lightning arrester disconnector systems for connection with the high voltage terminals of system components. Many electrical components, for example, power transmission transformers having external high voltage terminals, are protected by a lightning arrester of the type having a characteristic element and an internal isolating spark gap, and an external additional spark gap, or an explosive disconnector is serially connected with the lightning arrester forming a protective system between the high voltage terminal and ground. More specifically, in a common type of commercial lightning arrester, the characteristic element is connected serially with one or more internal isolating gaps which normally function to keep the system voltage disconnected from the characteristic element until an abnormal voltage surge occurs. The characteristic element serves as a low resistance bypass to ground when surge currents resulting from abnormal line voltages occur and to interrupt the flow of system follow current as soon as the abnormal condition has been dissipated. One such lightning arrester suitable for use in the present invention is illustrated and described in the copending application of Edward H. Yonkers, Ser. No. 157,293, filed Nov. 16, 1961 now Patent Number 3,222,566, on Valve Type Lightning Arrester, and assigned to the same assignee as the present invention.

In one type of commercial installation, a lightning arrester of the type described above may have one end connected to ground potential, and the other end of the lightning arrester is provided with an external electrode spaced from an external terminal or lead of the transmission line component forming an additional external spark gap between the terminal and arrester. If the lightning arrester fails due to abnormal load conditions caused by excessive voltages or direct lightning strikes, it then affords little or no internal resistance to ground. Accordingly, the only protection of the transmission line component against an open short to the ground is afforded by the external gap formed between the upper terminal of the arrester and the component terminal. Many small overvoltages or surges are sufficient to jump across the external gap or to cause an arc to form across the gap, and such arcing action is frequently sufficient on over-voltages to cause continuous and repetitious blowing of fuses in the system. Not only is it necessary to afford fuse protection for the system, but such repetitive line failures are undesirable from the customer standpoint. Additionally, it is difficult to detect failed lightning arresters along the line so that replacement may be made.

In another type of lightning protective system, a lightning arrester is serially connected with an explosive-type arrester disconnector between an external lead or a high voltage component and the ground potential. One suitable arrester disconnector commonly used is illustrated and disclosed in Riley Patent No. 3,100,246, granted Aug. 6, 1963, and assigned to the same assignee as the present invention. The disconnector has adequate time delay characteristics so that discharges through the lightning protective system, sufficient to cause failure of the lightning arrester, will thereafter explode the charge in the arrester disconnector and, consequently, break the circuit or remove the arrester from the system. A failed arrester disconnector can be readily detected visually but, in the meantime, the protective system affords no protection whatsoever to the transmission line component, and subsequent overvoltage conditions may cause the transmission line components to fail.

Accordingly, it is an object of the present invention to provide a lightning arrester disconnector system which overcomes the above-mentioned difficulties.

Another object of the present invention is to provide a new and improved arrester disconnector.

Yet a further object of the present invention is to provide a new and improved lightning arrester disconnector system which gives a visual indication of a failed arrester, and provides continued protection against lightning surges during the interim period between the failure of the arrester and the discovery and replacement thereof.

Yet another object of the invention is the provision of a lightning or overvoltage surge protection system employing a serially connected lightning arrester and arrester disconnector wherein the terminals of the disconnector are fixedly supported to provide a spark gap for protection of the associated electrical component after a failure of the arrester.

Further objects and advantages of the present invention will become apparent as the following description proceeds and the features of novelty which characterizes the invention will be pointed out with particularity in the claims annexed to and forming a part of this specification.

In accordance with these and many other objects of the present invention, there is provided a lightning arrester disconnector system for the protection of a high voltage electrical component. The system includes a lightning arrester of the type having an internal characteristic element and an internal spark gap in serial connection with an arrester disconnector between a high voltage terminal of the electrical component and ground. The disconnector includes a rupturable housing which encloses a relatively large spark gap between a pair of terminals extending into the housing. Explosive means are mounted in the housing between the terminals forming a smaller spark gap and, when a current sufficient to fail the arrester jumps the smaller spark gap, the explosive means is ignited to rupture the housing and provide a visual indication of the failed lightning arrester. The terminals of the disconnector are fixedly supported so that rupture of the housing does not materially affect the distance across the relatively large spark gap therebetween and, accordingly, this spark gap provides continued surge protection for the electrical component after the arrester has failed. Advantageously, the lightning arrester disconnector system, according to the present invention, not only provides a ready visual indication of a failed arrester, but additionally affords continued protection against lightning surges during the interim period between failure of the arrester and replacement thereof.

For a better understanding of the present invention, reference may be had to the accompanying drawings, wherein:

FIG. 1 is a side elevational view, with portions broken away and in section, of a lightning arrester disconnector system according to the present invention as it is installed with a high voltage terminal of a power transmission component;

FIG. 2 is an elevational view of the lightning arrester unit of FIG. 1, illustrated after rupture of the explosive disconnector;

FIG. 3 is a cross-sectional view of one embodiment of an arrester disconnector according to the present invention; and FIG. 4 is a cross-sectional view of another embodiment of an arrester disconnector according to the present invention.

Referring now to the drawings, and particularly to FIGS. 1 and 2, there is illustrated a high voltage transmission component, here shown as a high voltage transmission transformer 10 including a grounded outer casing having a top wall 11 through which extends a high voltage lead 12. As is common in high voltage transformers, the lead 12 extends upwardly through a stacked insulator 13 to a terminal 14 mounted at the top of the insulator 13.

According to the present invention, the transformer 10 is protected with a lightning arrester system 15 comprising a lightning arrester 18 and an explosive disconnector 20 in serial connection between the transformer terminal 14 and ground. The lightning arrester 18 may be of known construction and, in the illustrated embodiment, may be of the type described and claimed in the above-mentioned application of Yonkers. Accordingly, the lightning arrester need not be herein described in detail. Briefly, however, the lightning arrester 18 includes an outer cylindrical housing 22 of dielectric material having an upper terminal 23 and a lower terminal 24. The lightning arrester 18 contains a suitable characteristic material, here shown as valve material 25 (FIGS. 1 and 2), serially connected with suitable internal isolating spark gap means 26 within the housing 22 and electrically connected serially between the terminals 23 and 24. The lightning arrester 18 is supported on a conducting bracket 28 which is electrically grounded to the grounded transformer casing 11, and the bracket 28 is electrically and mechanically connected to the lower terminal 24 to hold the lower end of the arrester in place. An electrode 30 is connected to the upper terminal 23 of the lightning arrester, and the electrode includes an upstanding tip or flange 30a at the outer end thereof for connection with and support of one end terminal of the arrester disconnector 20.

The lightning arrester system 15, according to the present invention, additionally includes an explosive arrester disconnector, such as the disconnector 20, illustrated in detail in FIG. 3. The disconnector includes a tubular housing 33 of insulating material, a first terminal 35 threaded into one end of the housing, and a second and smaller terminal 36 extending into the opposite end of the housing.

The first terminal 35 comprises a large threaded plug which has a flat inner end face 35a disposed within the interior of the housing, and the outer end of the plug is sealed against an enlarged bell-shaped end portion of the housing by an annular sealing gasket 37. The plug 35 is formed with an axial threaded bore therein to receive the stem of a mounting bolt 38 which extends through an aperture in the electrode flange 30a to electrically connect and mechanically support the plug on the upper end of the lightning arrester 18, as shown in FIGS. 1 and 2. The second terminal 36 includes a main body portion 36a which is integrally molded into the smaller opposite end of the housing and, to this end, the terminal body is formed with an annular recess 36b in the outer surface thereof to receive an annular ridge 33a formed in the internal bore of the housing 33 adjacent the smaller end thereof. The terminal 36 includes an outwardly extending, threaded stem 36c for electrically connecting and mechanically supporting the smaller end of the arrester disconnector 20. The stem 36c projects through an aperture formed in an upstanding flange of an angle bracket 14a mounted on the high voltage terminal 14 and a nut 39 is threaded onto the stem to support and hold the smaller end of the disconnector in place. Accordingly, the terminals 35 and 36 are fixedly and securely mounted on and electrically connected to the upper terminals of the lightning arrester 18 and transformer 10, respectively, and even though the disconnector housing 33 is ruptured, as shown in FIG. 2, the disconnector terminals remain in fixed position relative to one another to define a relatively large external spark gap D therebetween in serial connection with the lightning arrester. The spark gap D is defined as the distance between the inner, flat, circular end face 35a of the first terminal and an annular, inner end face 36d of the terminal 36 in spaced facing relation thereto.

In order to explosively rupture the housing 33 of the disconnector 20 and provide a visual indication that the lightning arrester 18 has failed, the disconnector includes a small charge of explosive material 40 which is sealed within a hollow stem 42a of a metallic rivet 42 positioned within the housing between the terminals 35 and 36. The rivet 42 includes a large buttonlike head 42b in electrical contact with the circular inner end face 35a of the terminal 35, and the lower end of the stem is closed with a small metallic cap 43 to seal the explosive material in the stem against moisture and other impurities. The stem 42a is in axial alignment with the longitudinal axis of the disconnector and projects toward the opposite terminal 36 and extends into an axial bore or recess 36e therein, slightly larger in diameter than the stem itself. Accordingly, the end portion of the stem 42a and cap 43 are spaced from the sidewalls and end of the terminal recess 36e, thereby forming a smaller internal spark gap $d$ measured between the sidewalls of the recess and the adjacent outer surface of the stem. The distance $d$ is much smaller than the distance D between the opposed spaced inner end faces of the terminals 35 and 36 and, accordingly, a much lower voltage is capable of causing an arc or discharge across the smaller gap $d$.

In order to hold the stem 42a in axial alignment with the terminals 35 and 36, an annular spacer 44 of high resistance conductive material is interposed between the head 42b of the rivet and the annular end face 36d of the disconnector terminal 36. The spacer 44 provides a high resistance path between the terminals 35 and 36 which reduces corona discharge between the terminals and eliminates radio and TV interference caused thereby.

When the voltage impressed across the small gap $d$ in the disconnector 20 becomes sufficient to cause an arc to form across the gap, the stem 42a is heated by the arc and, after a short period of time, enough heat is developed in the stem (which serves as a heat sink for this short period of time) to ignite the explosive material 40 therein. When this occurs, the housing 33 is ruptured between opposite ends thereof and the rivet 42 and spacer 44 are destroyed or ejected, leaving the disconnector in the condition shown in FIG. 2 with the terminals 35 and 36 exposed. Because the terminals 35 and 36 are fixedly mounted on the lightning arrester 18 and transformer terminal 14, respectively, the explosive ignition of the material 40 and rupture of the housing 33 does not materially affect the relative position of the terminals 35 and 36, so that the spark gap spacing D is not changed substantially and the spark gap is available to protect the transformer 10 even though the arrester 18 has failed and now presents a low resistance path or short between the upper and lower terminals thereof. Consequently, after such an arrester failure caused by a lightning strike or other overload condition, the disconnector terminals 35 and 36 themselves provide an external spark gap protection for the transformer until the arrester 18 and disconnector 20 can be replaced.

In order to facilitate rupture of the housing 33 in an area between the opposite ends thereof in a manner leaving the terminals intact, as shown in FIG. 2, the housing wall is formed with one or more annular wall sections of reduced thickness, indicated, for example, by the letters T1 and T2 in FIG. 3. The reduced wall section T1 is formed at the angular intersection or junction of an enlarged cylindrical bore 48 in the large end of the housing adjacent the terminal 35 and a frustoconical bore 50 directed inwardly therefrom in a direction toward the smaller terminal 36. A second thin wall section at T2 is formed adjacent the annular inner end face 36d of terminal 36 by means of an inwardly extending annular recess 52 formed in the outer surface of the housing 33. Because of the reduced thickness of the wall sections at T1 and T2, the housing 33 will tend to rupture adjacent these sections, and the portion therebetween is blown apart by the ignition of the explosive material 40 in the rivet stem 42a.

With the housing ruptured in this manner (FIG. 2) it is easy for a line repairman on the ground to determine that the arrester 18 associated with the disconnector 20 has failed. Moreover, the terminals 35 and 36 remain in their same positions relative to each other after rupture of the disconnector housing 33 and provide continuous spark gap protection for the transformer 10 until the failure is discovered and the arrester 18 and disconnector 20 are replaced. By utilizing the disconnector terminals 35 and 36 to form the external spark gap D after arrester failure, the number of components and parts in the arrester disconnector system 15 is reduced and other spark gap forming components are not required.

Referring now to FIGURE 4, therein is illustrated another embodiment of an arrester disconnector in accordance with the present invention, indicated generally by the reference numeral 20A. Many components of the disconnector 20A are identical with those in the disconnector 20 and are given identical reference numerals and the operation of the disconnector 20A is identical with that of the previously described disconnector. The housing 33A of the disconnector 20A differs somewhat from the housing 33 in that it is formed with a generally thinner wall section around the spark gap D and adjacent the terminal 36. Specifically, because of the reduced wall thickness in this region, there is no need for an annular recess, such as the recess 52 in the connector 20. The housing 33A is formed with a deeper concave transitioning surface 54 adjacent the section T1 than that provided in the disconnector 20. Rupture of the housing wall 33A takes place between the thin wall sections at T1 and T2 in a fashion similar to that of the connector 20, which employs a generally thicker housing wall throughout.

Although the present invention has been described by reference to two embodiments thereof, it will be apparent that numerous other modifications and embodiments will be devised by others skilled in the art which will fall within the true spirit and scope of the present invention.

What is claimed as new and desired to be secured by Letters Patent of the United States is:

1. A lightning arrester assembly for use with a high voltage electrical system comprising a lightning arrester and arrester disconnector means normally serially connected between a high voltage terminal of said system and ground, said arrester disconnector means including a housing and a pair of spaced terminals in said housing forming a relatively large spark gap therebetween, and explosive means in said housing between said spaced terminals including a containing conducting member forming a smaller spark gap with one of said terminals, said explosive disconnector means being operable upon current flow across said smaller spark gap to rupture said housing around said gap, and rigid support means for maintaining said spaced terminals in exposed spark gap forming relation after the rupture of said housing by said explosive disconnector means.

2. The lightning arrester assembly of claim 1 wherein said support means includes terminal means supported by a component of said high voltage system and terminal means supported by said lightning arrester.

3. The lightning arrester assembly of claim 2 including grounded bracket means for supporting said arrester and connected to an opposite terminal thereof.

4. The lightning arrester assembly of claim 1 wherein said housing comprises a tubular wall structure having at least one annular wall portion of reduced thickness intermediate the ends thereof to facilitate the rupture of said housing around said large spark gap by said explosive means.

5. The lightning arrester assembly of claim 1 wherein said explosive means is contained in a tubular conductor having a closed end in contact with one terminal of said arrester disconnector means and an opposite end spaced from the other spaced terminal of said arrester disconnector means by a distance less than the spark gap distance between said terminals.

6. The lightning arrester assembly of claim 1 including an annular spacer of high resistance conductive material shunting said spark gap within said housing.

7. An arrester disconnector for protecting high voltage electrical components comprising a tubular housing of insulating material, a pair of terminals projecting into said housing from opposite ends thereof and having opposed facing inner end portions spaced apart forming a relatively large spark gap therebetween, and explosive means in said housing between said terminals including conducting means forming a smaller spark gap between said terminals operable to rupture said housing and expose said terminals upon passage of current across said smaller gap, said housing including an annular wall section of reduced thickness intermediate its ends to facilitate the rupture of said housing around said larger spark gap by said explosive means.

8. The arrester disconnector of claim 7 wherein one of said terminals is molded into said housing and sealingly closes one end thereof, and said annular wall section of reduced thickness is formed by an annular recess in said housing wall adjacent the inner end of said one terminal.

9. The arrester disconnector of claim 7 wherein said explosive means is contained in a tubular conductor having a closed end contacting one of said terminals and an opposite end projecting toward the opposite terminal and spaced therefrom forming said smaller spark gap.

10. The arrester disconnector of claim 9 including cap means for closing said opposite end of said tubular conductor and sealing said explosive material therein.

11. The arrester disconnector of claim 7 including an annular spacer of high resistance conductive material shunting said spark gap inside said housing.

12. The arrester disconnector of claim 7 wherein said wall section of reduced thickness is formed at the junction of angularly intersecting internal wall surfaces defined in the bore of said housing.

13. In combination with a high voltage electrical component and grounding structure of an electrical system, a lightning arrester and arrester disconnector serially connected between said high voltage terminal and said grounding structure, said arrester disconnector including a tubular housing, a pair of spaced terminals extending into said housing from opposite ends thereof and having inner ends spaced apart to form a relatively large spark gap therein, and explosive means in said housing between said spaced terminals including a containing conducting member forming a smaller spark gap with one of said terminals, said explosive means operable for rupturing said housing upon the passage of current across said smaller spark gap, and fixed support means for maintaining said larger spark gap spacing between said spaced terminals upon rupturing of said housing.

14. The combination of claim 13 wherein said fixed support means includes a terminal of said electrical component and a terminal of said lightning arrester.

15. The combination of claim 12 wherein said housing includes an annular wall section intermediate the ends thereof having a reduced thickness for facilitating the rupture thereof by said explosive means.

References Cited
UNITED STATES PATENTS

| | | | |
|---|---|---|---|
| 3,100,246 | 8/1963 | Riley | 200—115 |
| 3,222,566 | 2/1966 | Yonkers | 315—36 |
| 3,249,815 | 5/1966 | Henry | 200—115 |
| 3,239,631 | 3/1966 | Snell | 200—115 |

LEE T. HIX, *Primary Examiner.*

R. V. LUPO, *Assistant Examiner.*